United States Patent

Wolff

(10) Patent No.: US 7,946,130 B2
(45) Date of Patent: May 24, 2011

(54) ORGANIC AND INORGANIC PEROXIDES AS REFINING AGENTS IN THE PRODUCTION OF GLASS

(75) Inventor: Silke Wolff, Hueckeswagen (DE)

(73) Assignee: Schott AG, Mainz (DE)

( * ) Notice: Subject to any disclaimer, the term of this patent is extended or adjusted under 35 U.S.C. 154(b) by 210 days.

(21) Appl. No.: 12/172,709

(22) Filed: Jul. 14, 2008

(65) Prior Publication Data

US 2009/0023573 A1     Jan. 22, 2009

(30) Foreign Application Priority Data

Jul. 17, 2007    (DE) .......................... 10 2007 033 648

(51) Int. Cl.
*C03B 5/225*     (2006.01)
*C03B 5/16*      (2006.01)
*C03B 5/00*      (2006.01)
*C03C 6/02*      (2006.01)

(52) U.S. Cl. ..................... 65/134.9; 65/134.1; 65/134.3; 501/27

(58) Field of Classification Search .................... 501/27; 65/134.1–134.9

See application file for complete search history.

(56) References Cited

U.S. PATENT DOCUMENTS

| 2,929,675 | A | * | 3/1960 | Von Wranau et al. | .......... 65/474 |
| 4,612,292 | A |   | 9/1986 | Richard |   |
| 5,897,678 | A | * | 4/1999 | Komiya et al. | .............. 65/134.1 |
| 6,230,521 | B1 | * | 5/2001 | Lehman | ....................... 65/29.11 |
| 6,871,514 | B2 |   | 3/2005 | Muschik et al. |   |
| 7,087,543 | B2 | * | 8/2006 | Kasuga et al. | ................. 501/79 |

FOREIGN PATENT DOCUMENTS

| EP | 1 473 284 | 11/2004 |
| GB | 191116603 | 2/1912 |
| GB | 658141 | 10/1951 |
| GB | 1147847 | 4/1969 |

* cited by examiner

*Primary Examiner* — Karl E Group
*Assistant Examiner* — Elizabeth A Bolden
(74) *Attorney, Agent, or Firm* — Michael J. Striker

(57) ABSTRACT

In the process of producing a glass, a glass melt is formed from an initial glass batch, an inorganic or organic peroxide is include in the glass melt as a refining agent in an amount suitable for refining, and then the glass melt is refined at a refining temperature equal to or greater than a decomposition temperature of the inorganic or organic peroxide. The inorganic peroxides used in the glass-making process only include cations that are already present in components of the initial glass batch. The organic peroxides used in the glass-making process are chosen so that the organic residue remaining in the melt after release of oxygen is decomposed to volatile water and $CO_2$.

11 Claims, No Drawings

ORGANIC AND INORGANIC PEROXIDES AS REFINING AGENTS IN THE PRODUCTION OF GLASS

CROSS-REFERENCE TO A RELATED APPLICATION

The invention described and claimed hereinbelow is also described in German Patent Application DE 10 2007 033 648.0 filed on Jul. 17, 2007. This German Patent Application, subject matter of which is incorporated herein by reference, provides the basis for a claim of priority of invention under 35 U.S.C. 119(a)-(d).

BACKGROUND OF THE INVENTION

The development of the different optical technologies has led to an enormous diversification of the required optical components in the last decades. Among these were classical optical components such as lenses, prisms, fibres and the like. Additionally, the requirements to their properties were strongly increasing. These properties are for example light efficiency, resolution or unconventional light transmission, but also less classical properties like thermo-shock resistant joining abilities in sockets, melting properties, suitability for secondary precision moulding and others.

These new diversified requisite profiles of the components are reflected in the newly developed optical glass types that constitute the raw material for component manufacturing. These glasses are increasingly no longer classically defined by their optical position like known optical glass families with classical composition ranges, but constitute optimized multi-component glasses for special applications.

Such "designer glasses" have to be considered very sensitive concerning their properties with regard to their compositions. Already small changes in synthesis or impurities that are due to the process conduct like for example $SiO_2$ from quartz trough, platinum from platinum units or similar as well as small changes in process parameters like temperature, atmosphere, change in raw material form and the like have huge impact on the property profile of the glasses and render these less usable or even unusable in the worst case, while the synthesis remains unchanged.

Due to increasing environmental awareness of the industry, the market and the buyer, and also due to the improvements in legislation that are connected thereto, the number of batch components that are deployable for the implementation of the complex specification profiles of the glasses has been reduced sensitively.

Conventional refining agents have to be considered very critical with regard to this environmental aspect. These refining agents are used in order to achieve an acceptable optical inner quality as far as bubbles are concerned, while they are basically not even a part of the desired composition.

Those refining agents that are especially used for the production of glasses with highest requirements are based on chemical redox mechanisms of polyvalent components like for example arsenic and antimony oxide. After arsenic trioxide has been banned for years, the respective antimony component is more and more discredited which is among other reasons due to the transmission lowering effect at the blue spectral edge.

A further disadvantage of conventional refining agents is that these systems can only be activated at high temperatures that are for example too high for modern melting processes of new glasses with low glass transmission temperatures, also for so-called low-$T_g$ glasses. Such systems are useless in these glasses.

Purely physical fining methods (for example evaporation, negative pressure and others) are not convincing in all glass systems, because a special concerted temperature viscosity profile is needed for their successful application, which is in conflict to applicative usage in many glass systems. Furthermore, even the physical evaporation fining process is based on more or less controllable evaporation of single components which does not contribute to the domination of such processes.

Due to the fact that conventional refining agents like polyvalent components are as such extrinsic to the synthesis and applicatively superfluous or even exerting negative influence onto the desired properties of the glasses, these components should not be used.

SUMMARY OF THE INVENTION

It is hence object of the present invention to provide a novel refining system, neither the agents of which nor the residue of which do affect the applicative desired synthesis and are nevertheless universally applicable to a desirably large bandwidth of glasses. Especially, these refining agents shall be applicable to processes for the production of glasses with low glass transition temperatures.

This object is solved by the present invention by application of organic and/or inorganic peroxides as refining agents in a method for refining glass melts. That includes in particular also mixtures of peroxides, such as for example mixtures comprising one or more anorganic peroxide, one or more organic peroxide and preferably a mixture including at least one anorganic and at least one organic peroxide and mixtures comprising at least two organic peroxides are particularly preferred. According to preferred embodiments $H_2O_2$ as inorganic peroxide is accompanied by at least one further peroxide, either organic or inorganic.

As to the amounts of fining agents to be used, the skilled person will be in a position to determine the same adapted to this particular kind of fining agents. For example, but not limited to, amounts of from 0.1% weight up to 10% by weight based on the initial batch are suited with preferred amounts from up to 5% by weight such as for example 1.1% to 4.9% by weight.

These peroxides are available in such a bandwidth that they can be chosen specifically according to the viscosity temperature profile of a glass and are thus able to be integrated in the applicative meaningful synthesis in such a manner that in the final product, in the raw glass, no traces of these peroxides are detectable.

Peroxides can be classified into inorganic peroxides and organic peroxides. Inorganic peroxides are components of the general formula $M_2O_2$ (wherein M is for example selected from the alkaline metals like for example Na) or $M^*O_2$ (wherein $M^*$ is selected from the group of alkaline earth metals like for example Ba).

Next to alkaline metal and alkaline earth metal peroxides also peroxides of cadmium, mercury and tin are known. Peroxides of transition metals preferably build peroxo-complexes with dioxygen ($O_2$) ligands.

Organic peroxides are for example classified in hydroperoxides of the type R—O—O—H and "classical" peroxides of the type R—O—O—R.

Organic peroxides are preferred according to the present invention.

Preferably, hydroperoxides are used within the method according to the present invention, wherein R is a saturated or unsaturated, branched or un-branched hydrocarbon residue with at least 4 carbon atoms, preferably not more than 25 carbon atoms, preferably from 4 to 25 carbon atoms, wherein 5 to 18 and preferably 8 to 15 are also suited.

Preferably, "classical" peroxides are used in the method according to the present invention, wherein R is a saturated or unsaturated, branched or un-branched hydrocarbon residue with at least 4 carbon atoms, preferably not more than 25 carbon atoms, preferably from 4 to 25 carbon atoms, wherein 5 to 18 and preferably 8 to 15 are also suited.

Applicable are also diacylperoxides, peracids, peracid esters and ketone peroxides. Hydrocarbon residues R are preferably saturated or unsaturated, branched or un-branched hydrocarbon residue with at least 4 carbon atoms, preferably not more than 25 carbon atoms, preferably from 4 to 25 carbon atoms, wherein 5 to 18 and preferably 8 to 15 are also suited.

The person skilled in the art will choose such components from the applicable peroxides that are meaningfully applicable to the refining of the respective glass. Preferably, these peroxides decompose at temperatures in ranges of from 200° C. to 1500° C., 200° C. to 1200° C., 200° C. to 1100° C., 200° C. to 1000° C., further preferred in ranges of from 400° C. to 1500° C., 400° C. to 1200° C., 400° C. to 1100° C. and 400° C. to 1000° C. and most preferred in ranges of from 700° C. to 1500° C., even more preferred of from 900° C. to 1500° C. as well as from 700° C. to 1200° C. or 900° C. to 1200° C. further from 700° C. to 1100° C., 900° C. to 1100° C. or from 700° C. to 1000° C. and finally from 900° C. to 1000° C. The oxygen that is separated from the peroxides serves for refining according to the present invention.

The kind of initiation needed is based on the character of the educt but almost all peroxides are at least thermally unstable which can be used for refining. The flexibility of this group of refining agents is based on the stabilisation of the peroxide group by adjacent groups that can be multiply varied at least in organic peroxides. Refining temperature, i.e. the operation temperature of the substance, is equal to their decomposition temperatures or is higher than these temperatures. This is of special advantage for modern low-$T_g$ glasses with very low melting temperatures.

Classical refining systems fail at this point because they cannot be activated at such low process temperatures. Therefore these strategically interesting glasses have up to now been bound to physical refining methods that involve the evaporation of components although this might be applicatively unnecessary. Additionally, the melting process can be destabilized because a targeted evaporation is difficult to control.

Some examples for applicable peroxides and their decomposition temperatures are:

| peroxides | decomposition temperatures |
| --- | --- |
| $SrO_2$ | 500° C. |
| $BaO_2$ | 800° C. |
| $CaO_2$ | 275° C. |
| $Cs_2O_2$ | 650° C. |
| $Rb_2O_2$ | 600° C. |
| $Li_2O_2$ | 195° C. |
| $Na_2O_2$ | 700° C. |
| $K_2O_2$ | 490° C. |

-continued

| peroxides | decomposition temperatures |
| --- | --- |
| dibenzoylperoxide | 105° C. |
| hydrogenperoxide | 150° C. |

The applicable peroxides are not restricted to those mentioned in the list above. There are numerous peroxides at disposal so that for every planned melting temperature and glass compositions suitable inorganic and/or organic peroxides or mixtures of many inorganic and/or organic peroxides are available.

Especially the organic peroxides enable the skilled person to influence the stability of the peroxide in such a manner that the desired properties are obtained by variation of the hydrocarbon or carbon chain. Toxic decomposition products are not expected when applying the organic peroxides according to the present invention.

When applying the organic peroxides according to the present invention as refining agents only an organic residue remains in the melt after liberation of oxygen which residue is decomposed to volatile water and $CO_2$, which additionally contributes to the refining process.

The above mentioned inorganic peroxides can be chosen so that they do not influence the properties of the glass negatively. This is especially the case for peroxides, the metal component of which is already comprised in the batch. This will usually apply to the peroxides of calcium, barium, natrium, potassium and lithium. Basically, this can apply to every peroxide, the metal component of which is present as a cation in the batch; its properties are thus desired in the glass. The cations of these peroxides can therefore be accounted for during calculation of the synthesis. In this manner no components that are extrinsic to the synthesis and degrading the sensitive glasses remain in the melt.

Preferably, the present invention refers to the use of at least one peroxide as a refining agent in a composition for the manufacturing of glass. It is particularly preferred that no further refining agents that do not comprise a peroxide structure are present next to the peroxide.

DESCRIPTION OF THE PREFERRED EMBODIMENTS

According to a special embodiment the at least one peroxide is an inorganic peroxide that preferably comprises the same cations as the other components of the composition for the manufacturing of glass.

The inorganic peroxide of for example alkaline metal peroxides and alkaline earth metal peroxides are preferred.

Preferably, the organic peroxide is chosen from for example dialkylperoxides, alkyl hydroperoxides, peracids, peracid esthers, ketone peroxides and diacylperoxides.

Preferably, the refining temperature in the process is at least equal to the decomposition temperature of the applied peroxide or the applied peroxides as far as several different refining agents are used. The refining temperature can also be chosen higher than that.

Moreover, also a glass which is obtained according to the process according to the present invention is also subject to the present invention.

Further subjects of the present invention are components that have been manufactured using the above described glasses like for example lenses, prisms, light conductor rods, optical fibres and optical windows as well as their use in optical parts and optical components for imaging, digital projection, photolithography, for the manufacturing of steppers and excimer lasers, wafers, computer chips, integrated circuits, electronic devices that contain such circuits, telecommunications, optical communications engineering and information transfer as well as illumination purposes.

The invention claimed is:

1. A process of producing a glass, said process comprising the steps of:
   a) forming a glass melt from an initial glass batch;
   b) including one or more refining agents in the glass melt in an amount suitable for refining, said one or more refining agents consisting of at least one peroxide compound; and
   c) refining the glass melt containing the at least one peroxide compound at a refining temperature equal to or greater than a decomposition temperature of said at least one peroxide compound in order to form said glass;
   wherein said at least one peroxide compound is composed so that said glass formed by the process contains no other metal cation besides those present in the initial glass batch.

2. The process as defined in claim 1, wherein the glass melt contains from 0.1 to 10 wt. % of said at least one peroxide compound, based on a total amount of the initial glass batch.

3. The process as defined in claim 1, wherein said at least one peroxide compound consists of at least one inorganic peroxide.

4. The process as defined in claim 3, wherein said at least one inorganic peroxide comprises a cation or cations that is or are already present in components of said initial glass batch.

5. The process as defined in claim 3, wherein said at least one inorganic peroxide is selected from the group consisting of hydrogen peroxide, alkali metal peroxides and alkaline earth metal peroxides.

6. The process as defined in claim 1, wherein said at least one peroxide compound is at least one organic peroxide.

7. The process as defined in claim 6, wherein said at least one organic peroxide is selected from the group consisting of dialkyl peroxides, alkyl hydroperoxides, peracids, peracid esters, ketone peroxides and diacyl peroxides.

8. The process as defined in claim 6, wherein said at least one organic peroxide has a hydrocarbon group with at least four carbon atoms.

9. The process as defined in claim 6, wherein during the refining said at least one organic peroxide decomposes to form oxygen and an organic residue that further decomposes to volatile water and carbon dioxide which contribute to the refining.

10. An optical part or an optical component for the fields of imaging, digital projection, photolithography, for manufacturing steppers and excimer lasers, wafers, computer chips, integrated circuits, electronic devices that comprise such circuits, for telecommunications, optical communications engineering and information transfer and illumination purposes, said optical part or said optical component comprising a glass that is obtained by the process of claim 1.

11. The optical part or the optical component according to claim 10, consisting of a lens, a prism, a light conductor rod, an optical fiber or an optical window.

* * * * *